United States Patent [19]
Herpich

[11] 3,839,931
[45] Oct. 8, 1974

[54] TUBE CUTTER
[75] Inventor: William M. Herpich, Litchfield, Conn.
[73] Assignee: The Torrington Company, Torrington, Conn.
[22] Filed: Feb. 28, 1973
[21] Appl. No.: 336,543

[52] U.S. Cl............................ 82/54, 82/82, 82/88, 82/102
[51] Int. Cl............................................ B23d 21/14
[58] Field of Search............... 82/54, 57, 58, 82, 88, 82/101, 102

[56] References Cited
UNITED STATES PATENTS
1,605,924  11/1926  Dodd .................................... 82/54
3,359,841  12/1967  Cvacho et al........................... 82/82
3,546,987  12/1970  Procter ................................. 82/58

Primary Examiner—Leonidas Vlachos
Attorney, Agent, or Firm—Frank S. Troidl

[57] ABSTRACT

The new tube-cutting machine includes a pivotable frame. A tube-cutting arbor, mounted in the frame, is used to penetrate the inside of the tube to be cut. After penetration, the tube-cutting arbor is rolled about the inside of the tube while shearing the tube for a complete cycle to shear off the end of the tube. At the end of the cycle, the shearing is automatically stopped, and the pivotable frame returned to its first position.

10 Claims, 9 Drawing Figures

TUBE CUTTER

This invention relates to tube cutters. More particularly, this invention is a new and improved tube-cutting machine for shearing off a predetermined length of tube. The edges of the sheared tube are perfectly square, which is very important when the sheared tube is used for certain machine parts such as bearings.

One of the problems with currently used tube-cutting machines is that the edges of the resulting tubes are rough. This roughness is caused by (1) the use of a sharp-edged cutter such as V-shaped or wedged shaped cutter, and (2) a certain amount of cold metal flow caused by the shape of the cutter.

This invention is a tube-cutting machine which cuts a predetermined length of tube with the resulting tube having very smooth edges.

Briefly described, my new tube cutter includes a pivotable member. A spindle is rotatably mounted in the spindle by an eccentric bushing. A tube-cutting arbor, which is integral with the arbor shaft, extends outwardly from the pivotable member. The arbor shaft is supported in the pivotable member by the eccentric bushing so that the axis of the cutting arbor is always kept offset a predetermined amount from the axis of the spindle. The tube is fed to a position so that the tube-cutting arbor may cut a predetermineed length of the tube.

The pivotable member automatically pivots the tube-cutting arbor into penetrating contact with the inside of the tube. The tube-cutting arbor is then automatically rolled about the inside of the tube for a complete cycle to shear off the end portion of the tube. The shearing action is automatically stopped at the end of the cycle, and the tube-cutting arbor returns to its first position. The cycle is continuously repeated until the entire tube has been cut into shorter tubes of predetermined length.

The tube-cutting arbor is cylindrical and may have a diameter ranging from 50 to 75 percent of the inside diameter of the tube. With this shape of tube-cutting arbor, the inside of the tube is not cut in the same manner as would be the case with a sharp-edged cutter of the V-shaped or wedged-shape type. Also, there is no cold metal flow. When the tube-cutting arbor is initially moved into contact with the inside of the tube, the cutting arbor bulges the tube until the tube starts to shear. Then, as the tube-cutting arbor is rolled through the 360° cycle, there is a shearing action which shears off the predetermined length of the tube, resulting in a shorter tube which has exceptionally smooth edges.

The invention, as well as its many advantages, may be further understood by reference to the following detailed description and drawings in which.

Figure 1:
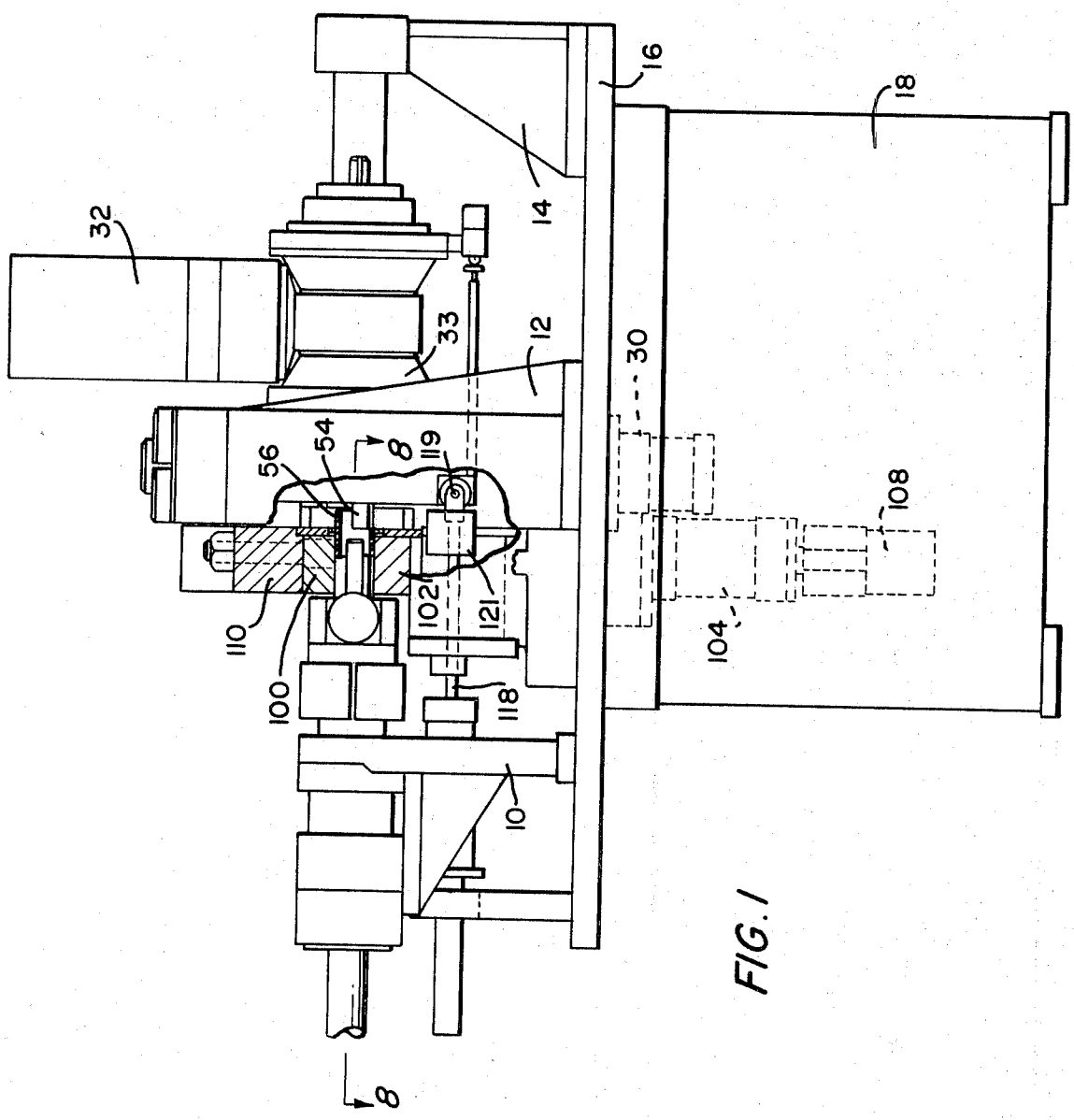
FIG. 1 is a side elevational view, partly in section, showing the general arrangement of my new tube cutter machine.

Referring to the figures, and more particularly to FIG. 1, the tube-cutting mechanism is mounted on longitudinally-spaced brackets 10, 12, and 14. The brackets are mounted on a large platform 16 supported by the pedestal 18.

Figure 2:
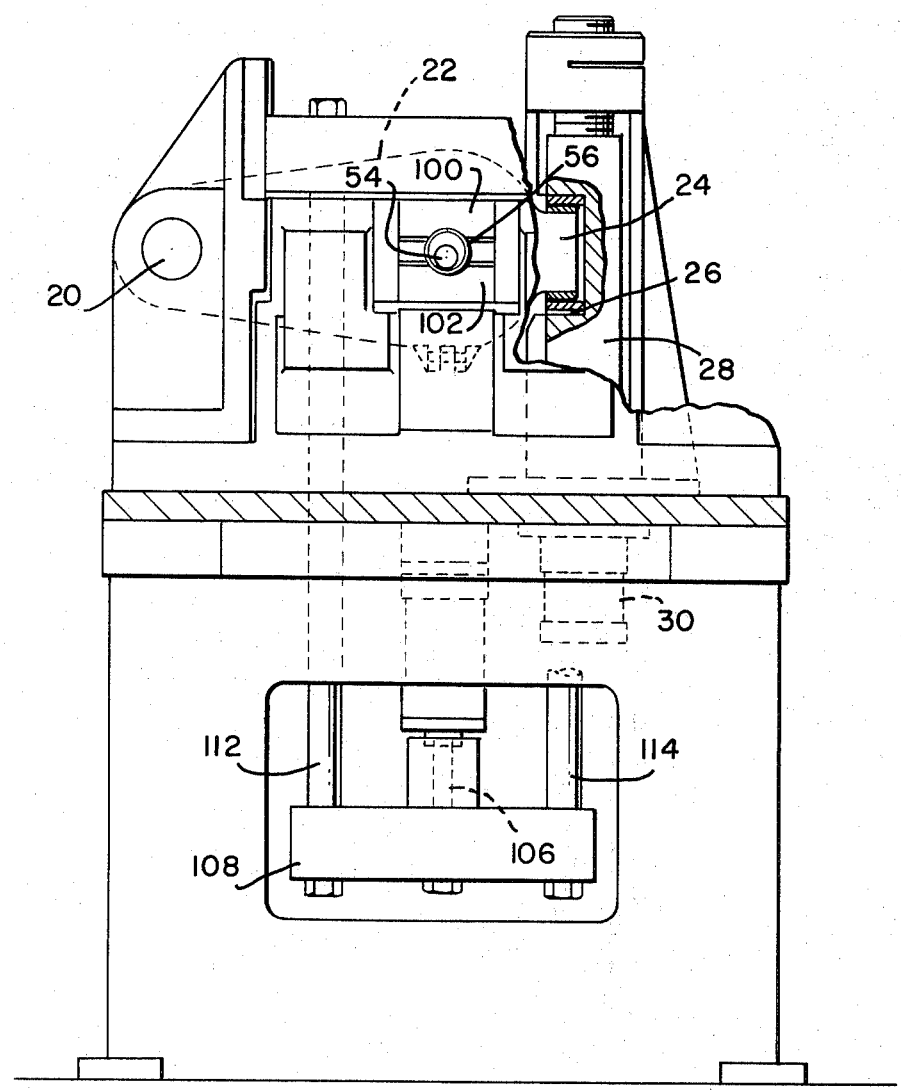
FIG. 2 is a front elevational view, partly in section, illustrating the yoke system for pivoting the tube cutter into and out of contact with the inside of the tube.

Referring to FIG. 2, a shaft 20 is provided. Pivot arm 22, shown in broken lines, is pivotally mounted on the shaft. The pivot arm, in addition to being pivotable about the shaft, is also mounted for slidable movement along the shaft.

A self-aligning bushing 24, on the outer end of the arm 22, is moved in a vertical direction by means of the yoke 26. The yoke is operated by piston rod 28, connected to hydraulic cylinder 30.

A continuously-running motor 32 (see FIG. 1) is mounted on the pivotable housing. A shaft (not shown) from the motor extends into a gear box 33.

Figure 7:
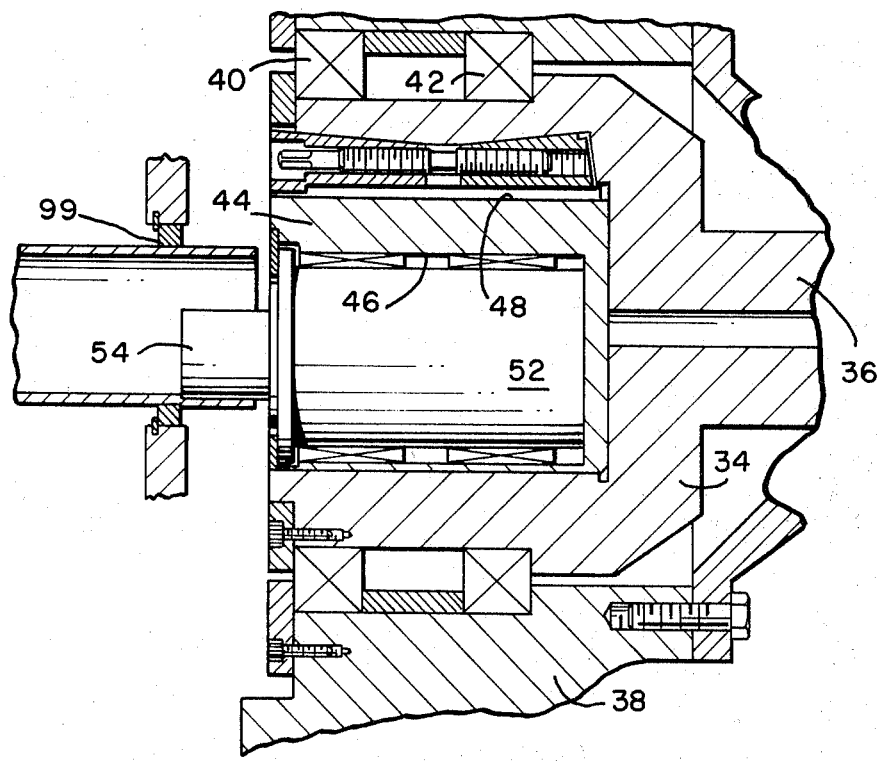
FIG. 7 is a side view, partly in section, showing the eccentric mounting of the cutting arbor.

As shown more clearly in FIG. 7, the drive spindle 34 is connected to the drive shaft 36, which extends from the gear box 33 (shown in FIG. 1). The drive shaft is mounted in the spindle support 38 which in turn is connected to the machine frame. The spindle can rotate within the spindle support because of the bearings 40 and 42, schematically illustrated, between the spindle and spindle support.

A bushing 44 is mounted within the cylindrical cavity formed in the spindle 34. The bushing is provided with a circular inside perimeter 46, and a circular outside perimeter 48. The axis of the outside perimeter is ecentric to the axis of the inside perimeter, thereby providing an eccentric bushing.

The eccentric bushing 44 supports the cylindrical arbor shaft 52. A plurality of bearings, schematically illustrated, separate the arbor shaft from the eccentric bushing. The integral cylindrical cutting member 54 extends outwardly from the frame and has a smaller diameter than the diameter of the arbor shaft. Preferably, the diameter of the cutter should range from 50 to 75 percent of the inside diameter of the tube to be cut.

Figure 4:
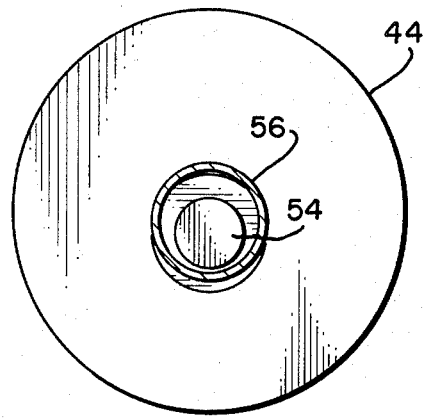
FIG. 4 is a view taken along lines 4—4 of FIG. 3.
Figure 3:
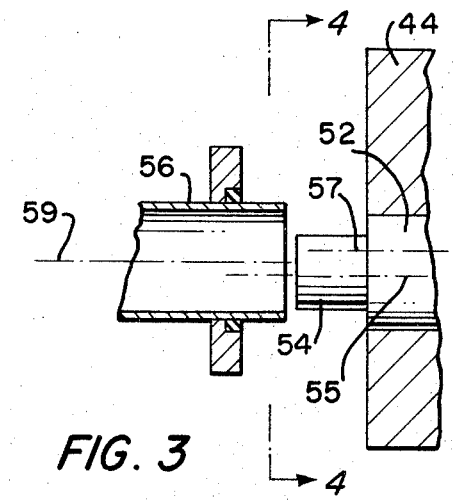
FIG. 3 is a sectional view, on an enlarged scale, showing the initial positions of the cutting arbor and tube.

FIG. 3 and FIG. 4 show the relative positions of the cutting member 54 and the tube 56 after a portion of the tube has been cut off, and the automatic tube-cutting machine is about to begin a new tube-cutting cycle. Note that the axis 55 of the cutting arbor is spaced from the axis 57 of the bushing. This spacing is caused by the eccentric bushing.

The axis 59 of the tube 56 is spaced from the axes of the cutting member and the bushing. By spacing the axis of the cutting member 54 below the axis of the tube, the cutting member is moved into the tube at a point just above the inside of the tube. This requires less distance for the cutting member 54 to move downwardly before the cutting operation begins, thus saving time, which is very important in automatic operations.

To start the cutting cycle, the piston rod 118 (see FIG. 1) is actuated to move the cutting arbor inwardly into the tube 56 while the tube-feeding system is operated to move the tube toward the right looking at FIG. 3. The piston rod is connected to the cutting arbor frame at 119. The continuous motor 32 and its associated parts, and the gear 33 and its associated parts, all supported on arm 22 all slide along shaft 20 (see FIG. 2). The movement of the cutting arbor inwardly is limited by stop 121.

The cylinder 30 is operated to move the member 28 downwardly (see FIG. 2) to cause the cutting member 54 to contact the inside of the tube 56, to produce a bulge 61.

Figure 6:
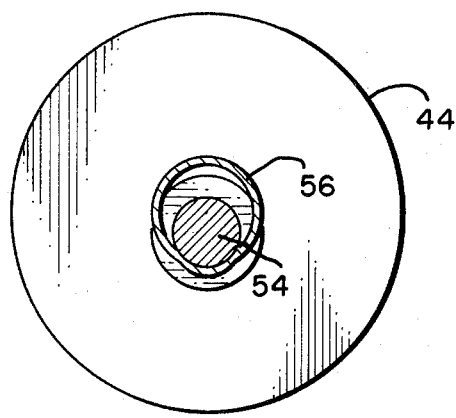
FIG. 6 is a view taken along lines 6—6 of FIG. 5.
Figure 5:
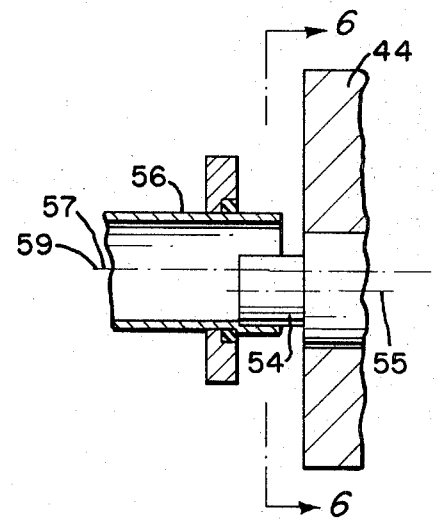
FIG. 5 is a view, similar to FIG. 3, showing the cutting arbor and tube in their tube-cutting positions.

As shown in FIG. 5 and FIG. 6, the bushing 44 and tube 56 have the same axis. The axis of the cutting arbor is spaced the predetermined distance from the axis of the bushing. This spacing, caused by the eccentric shape of the bushing 44, is maintained throughout the complete cutting cycle, thus keeping the cutting member 54 in contact with the inside of the tube 56 during the entire 360° cutting cycle.

Figure 8:
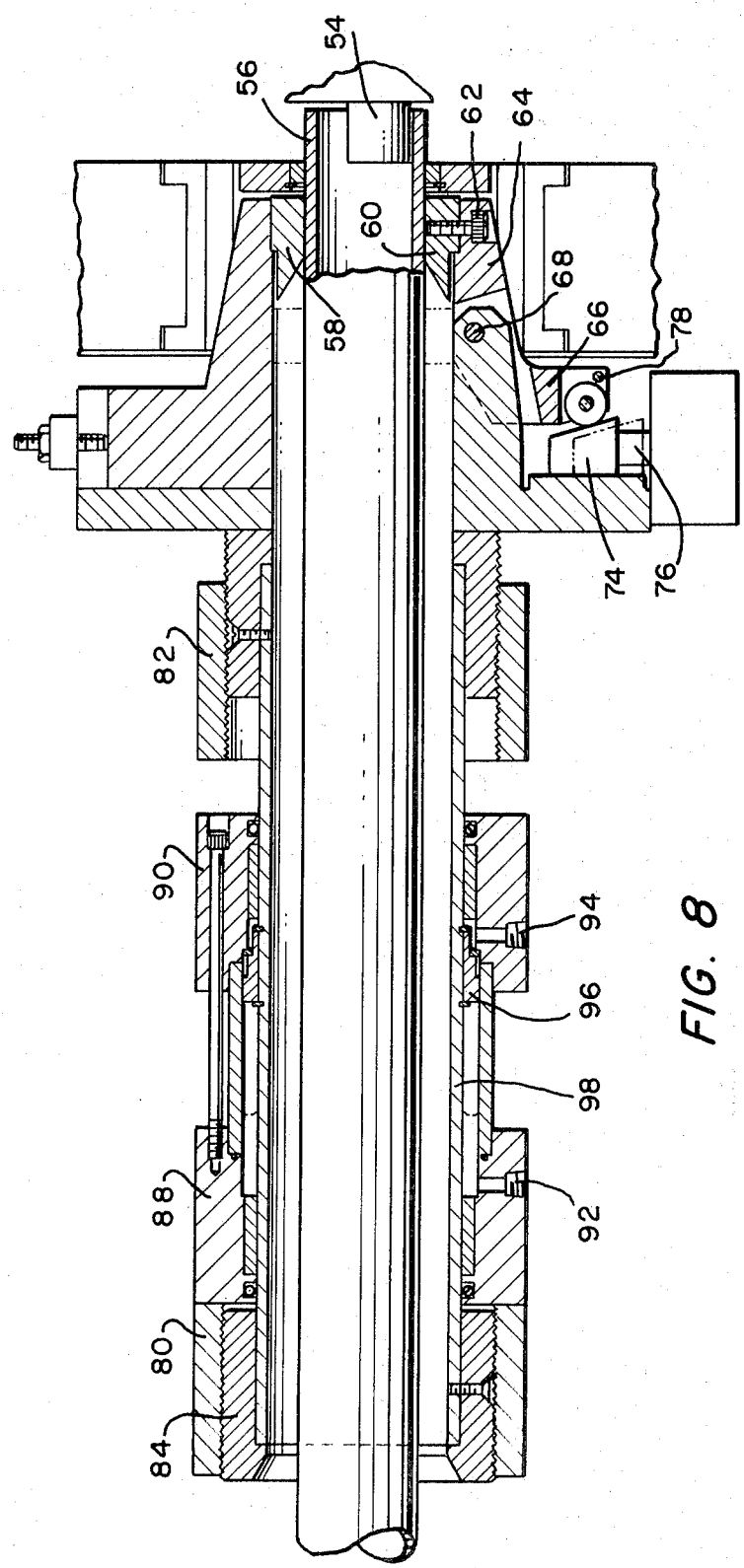
FIG. 8 is a view, on an enlarged scale, taken along lines 8—8 of FIG. 1.

Referring to FIG. 8, the cutting member 54 is shown in position within the tube 56 ready to be automatically actuated by hydraulic cylinder 30 (see FIG. 1) to contact the tube. The tube is fed to a predetermined position over the tube cutter 54 by the diametrically-spaced feeding jaws 58 and 60. Feeding jaw 58 slidably engages the outside of tube 56. Feeding jaw 60 is connected, by screw 62, to the feeding jaw support 64.

A bell-crank 66 is pivotably mounted, by means of pivot pin 68, to the feeding jaw support 64. Cam 74, connected to piston rod 76, is used to move the feeding jaw 60 radially into and out of tight gripping engagement with the tube 56. The springs 78 normally bias the bell-crank in a clockwise direction, looking at FIG. 8, to move the feeding jaw 60 out of contact with the tube. At the proper time in the cyclic sequence of the operation, the piston rod 76 moves the cam upwardly to move the bell-crank in a counter-clockwise direction about pivot 68 to move the feed jaw into tight, gripping contact with the tube.

The predetermined longitudinal movement of the tube 56 is controlled by the adjustable stop members 80 and 82. The adjustable stop members 80 and 82 are threadedly mounted about stop supports 84 and 86, respectively. The forward movement of the tube is limited by the contact of adjustable stop 80 against the annular member 88; the backward movement of the jaws 58 and 60 is limited by contact of the adjustable stop 82 against stop member 90. The distance between adjustable stop 82 and annular member 90, shown in FIG. 8, determines the length of the tube 56 to be fed over the tube cutter 54, and therefore, the length of the piece to be cut from the end of the tube. The distance, shown in FIG. 8, between adjustable stop 82 and annular member 90 is set to be equal to the distance between adjustable stop 80 and annular member 88, when the jaws 58 and 60 are in their rearwardmost position.

A hydraulic inlet passage 92 is provided in annular member 88, and a hydraulic passage 94 is provided in annular member 90. Hydraulic fluid, fed to the inlet passages 92 and 94, applies hydraulic pressure against the rear and front, respectively, of piston 96, connected to hollow piston rod 98.

When feed jaw 60 is retracted, hydraulic fluid, fed through hydraulic passageway 94, moves piston 96, rod 98, members 80, 82, 84, and 86, jaw support 64, and jaws 58 and 60 backwards until adjustable stop 82 contacts annular member 90. The feeding of hydraulic fluid through hydraulic passageway 92 against piston 96 moves the piston 96, and all the other attached members, forward until adjustable stop 80 contacts annular member 88. Prior to the forward movement, the system is automatically operated to move feeding jaw 60 into tight, gripping contact with the tube 56, so that movement of the piston rod 98 causes forward movement of the tube.

As shown in FIG. 1 and FIG. 2, diametrically-spaced clamps 100 and 102 are used to hold the tube 56 tightly, while the end of the tube is being cut off. The clamps are spaced 90° from feeding jaws 58 and 60.

Clamping member 102 slidably engages the tube 56. Clamping member 100 is operated by the hydraulic cylinder 104. The piston rod 106, extending from the hydraulic cylinder, is connected to lower cross-bar 108 by large bolts 112 and 114. Upper cross-bar 110 supports the upper clamp 100. Thus, upward or downward movement of the rod causes upward or downward movement respectively, of the upper clamp 100.

Figure 9:
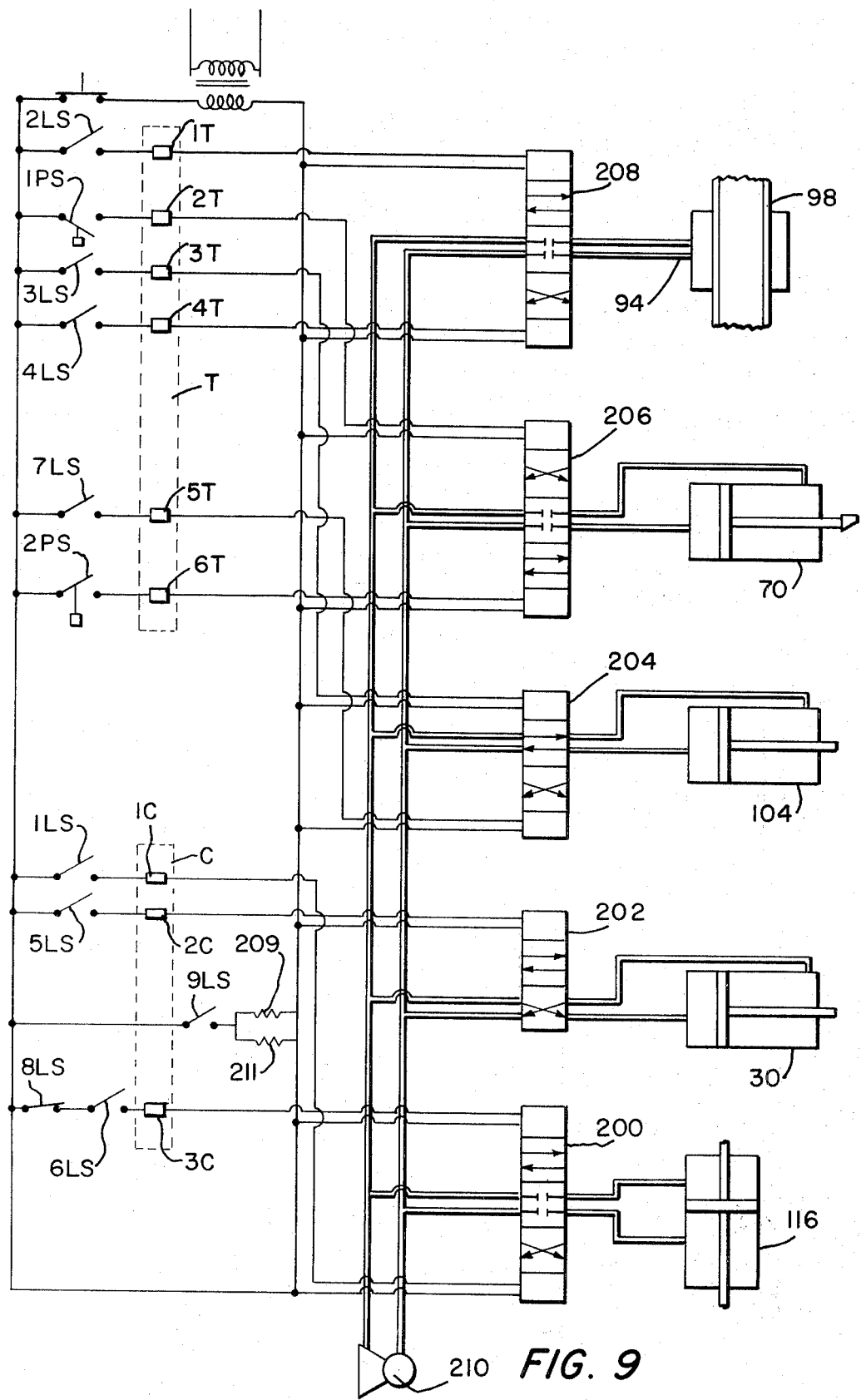
FIG. 9 is a schematic view of an electrohydraulic system for automatic control.

My tube-cutting machine is completely automatic. The automatic control system may take several different forms, including mechanical, electromechanical, electrohydraulic, and electropneumatic control systems. FIG. 9 schematically illustrates one type of electrohydraulic system for controlling the automatic operations.

The hydraulic fluid fed to the cylinder 116, the cylinder 30, the cylinder 104, the hydraulic piston 70, and the hydraulic piston 98, are controlled by solenoid valves 200, 202, 204, 206, and 208, respectively. Hydraulic pump 210 pumps fluid through the hydraulic line system shown in FIG. 9.

The operation of the various solenoids are controlled by an electrical system including a stepping switch T, shown by broken lines, for controlling the various automatic operations of the tube-feeding system. The electrical system also includes a stepping switch C, shown by broken lines, for controlling the cutting cycle of the cutting member. If desired, a single stepping switch may be used, rather than two stepping switches. Also, it is understood that only that portion of the stepping switch and the rest of the electrohydraulic system is shown necessary to illustrate one automatic control system which may be used with my invention.

In operation, assume that the cutting arbor is in the position shown in FIG. 3 and FIG. 4, and a new predetermined length of tube is to be cut from the tube 56. The stepping operations of the tube stepping switch T and the cutter stepping switch C overlap. As each step is performed by the stepping switches T and C, before the electrical circuit to a solenoid valve can be completed to perform a mechanical operation, it is necessary that a particular limit switch or pressure switch have been previously activated. The particular locations of the various limit switches and pressure switches to perform the desired operations are obvious to one skilled in the art.

Step 1C of stepping switch C is activated. If limit switch 1LS has been closed, solenoid valve 200 is moved to a position to cause hydraulic fluid to be fed into the hydraulic cylinder 116 (see FIG. 1), at a point to slide the entire tube-cutting frame, including the continuous motor 32, gear box 33, and the attached cutting arbor, toward the tube 56. Then step 1T of the tube stepping switch T is actuated. If limit switch 2LS has been previously closed, the electrical circuit to valve 208 is completed. Valve 208 is moved to a position so that hydraulic fluid is fed to passageway 92 (see FIG. 8) thereby moving tube 56 forward so that the cutting member 54 is now in position to be moved against the inside of the tube. The amount of movement is controlled by the location of the adjustable stop 80, with respect to annular member 88.

Step 2T is then actuated. If pressure switch 1PS has been previously actuated, the electrical circuit to solenoid valve 206 is completed to cause fluid to be fed to the hydraulic piston 70 at a point to unlock the feed jaws 58 and 60.

Thereafter, step 3T is actuated. If limit switch 3LS has been previously closed, the electrical circuit to solenoid valve 204 is completed to operate said valve to cause hydraulic fluid to be fed to hydraulic cylinder 104 (see FIG. 2) at a point to lock clamps 100 and 102. The tube 56 is thus held firmly for the cutting cycle.

Step 4T of stepping switch T is then actuated. If limit switch 4LS has been closed, the electrical circuit to solenoid valve 208 is completed, causing hydraulic fluid to be fed into passageway 94 (see FIG. 8), thus retracting the feed jaws 58 and 60.

Step 2C of stepping switch C is then actuated. If limit switch 5LS has been closed, the electrical circuit to solenoid valve 202 is compleIted, moving the valve 202 to a position such that hydraulic fluid is fed to hydraulic cylinder 30 (see FIG. 2), moving ram 28 downwardly so that the pivotable arm 22 is moved downwardly, thus causing the cutting member 54 to move against the inside of the tube 56, as shown in FIG. 5 and FIG. 6.

At this point, the limit switch 9LS is actuated. This actuates an electrical clutch 209, interconnecting the continuous motor 32 and the spindle shaft 36. At the same time, an electric brake 211, holding shaft 36 against rotary movement, is released. The electric clutch is a one-cycle clutch which automatically disengages after the cutting member 54 has completed the 360° cycle to cut off the predetermined end of the tube 56. When the one-cycle clutch disengages, the electric brake is engaged.

Shaft 36 (see FIG. 7) rotates eccentric bushing 44 through a complete cycle to shear the tube 56. The annular carbide insert 99 provides a strong back-up for the tube cutter to help the shearing operation. Because of the eccentric bushing, the tube cutter will be kept in contact with the inside of the tube as the shaft is rotated through one complete cycle, at which time the rotation of the shaft is stopped.

The arbor shaft 52 is not positively rotated; rather, the tube cutter rolls about the inside of the tube 56. This decreases the friction between the tube cutter and the tube, and also spreads out the wear effect on the tube cutter.

Thereafter, the step 3C of stepping switch C is actuated. However, before the solenoid valve 200 can be moved to a position to move the cutting arbor to the left, looking at FIG. 1, it is necessary not only that limit switch 6LS be closed, but also that limit switch 8LS be closed. Limit switch 6LS is connected to an appropriate point on the frame and previously actuated by the forward movement of the frame. However, limit switch 8LS is also highly important and is located in a position so that it is actuated by the falling of the cut-off end of the tube 56. Hence, it is necessary for the continued operation of the automatic machine that an end piece contact limit switch 8LS before the machine will continue to operate. If for some reason, the end piece is not cut off from the tube 56, or the tube 56 has been completely cut into predetermined lengths, the limit switch 8LS will not be actuated, and the machine will stop operating. This will prevent damage to the machine.

After the end of the tube has been cut off, step 5T of stepping switch T is actuated. If limit switch 7LS has been previously closed, the solenoid valve 204 is moved to a position so that hydraulic fluid fed to the hydraulic cylinder 104 will unlock the clamp 100 so that the tube 56 can be moved by the feed jaws 58 and 60.

Thereafter, the step 6T of stepping switch T is actuated. If pressure switch 2PS has been previously closed, the electrical circuit to solenoid valve 206 will be complete, thereby moving solenoid valve 206 to a position so that hydraulic fluid is fed to hydraulic piston 70 at a point to cause hydraulic ram 76 to move the cam 74 to a position to cause feed jaws 58 and 60 to grippingly engage the tube 56.

The cutting cycles are then repeated until the entire tube 56 has been cut into small tube lengths, each having a predetermined length.

I claim:

1. A tube-cutting machine comprising: a pivot member; a housing pivotally connected to said pivot member; a motor mounted on said housing; a motor-operated drive spindle rotatably mounted in said housing about an axis and having a coaxial bore; an eccentric bushing mounted in said coaxial bore; a cutting arbor extending outwardly from the eccentric bushing; means for positioning a tube and the cutting arbor with respect to each other so the cutting arbor may be used to cut a predetermined length of said tube; means for automatically pivoting the housing so that the cutting arbor is moved into contact with the inside of the tube; releasable means for tightly holding the tube; means for causing the cutting arbor to roll about the inside of the tube for a complete cycle to shear off the end portion of the tube; and means for automatically stopping the shearing action of the tube cutter at the end of the cycle.

2. A tube-cutting machine in accordance with claim 1 wherein the tube-cutting portion of the cutting arbor is cylindrical and has a diameter ranging from 50 to 75 percent of the inside diameter of the tube to be cut.

3. A tube-cutting machine in accordance with claim 1 wherein the means for positioning a tube and the cutting arbor comprises: a feeding jaw; means for moving said feeding jaw into a tight, gripping engagement with the tube; and means for longitudinally moving the feeding jaw a predetermined distance.

4. A tube-cutting machine in accordance with claim 3 wherein the means for moving the feeding jaw into tight engagement with the tube comprises: a feeding jaw support; a support-actuating member pivotally connected to said support and adapted to move said support radially into contact with the tubular member; and a cam actuatable to operate the support-actuating member to move the feeding jaw support radially toward the tubular member, thereby causing the feeding jaws to grippingly engage the tubular member.

5. A tube-cutting machine in accordance with claim 4 wherein the cam is connected to a hydraulically operated piston rod.

6. A tube-cutting machine comprising: a pivot member; a housing pivotally connected to said pivot member, a motor mounted on said housing; a drive spindle adapted to be operated by said motor and rotatably mounted in said housing, said spindle having a coaxial cylindrical cavity; a bushing mounted within the cylindrical cavity, said bushing having a circular inside perimeter and a circular outside perimeter, with the axis of the outside perimeter being eccentric to the axis of the inside perimeter, thereby providing an eccentric bushing; an arbor shaft mounted in the bushing; a cutting member, having less diameter than the diameter of the arbor shaft, extending outwardly from and integral with said arbor shaft; means for feeding over a predetermined length of the cutting member a tube to be cut; releasable means for tightly holding the tube; means for pulling the cutting member against the inside of the tube; and means for turning the spindle through a 360-degree arc, thereby cutting off a predetermined portion of the tube from the end thereof.

7. A tube-cutting machine in accordance with claim 6 wherein the means for pulling the cutting member against the inside of the tube comprises: hydraulically operated means adapted to pull the housing in a direction so that the cutting member penetrates the inside of the tube.

8. A tube-cutting machine in accordance with claim 7 wherein the cutting member is cylindrical and has a diameter ranging from 50 to 75 percent of the inside diameter of the tube to be cut.

9. A tube-cutting machine in accordance with claim 6 wherein the means for feeding the tube a predetermined distance over the cutting member comprises: at least one feeding jaw adapted to grippingly engage the outside of the tube; means for radially moving the feeding jaw into gripping engagement with the tube; an adjustable stop; a hydraulically-operated tubular piston rod for moving the feeding jaw and the tubular member longitudinally against the adjustable stop to locate the tube over the cutting member; means for releasing the feeding jaw from the tube; and means for retracting the feeding jaw lengthwise of the tube in preparation for automatically causing the feeding jaw to again grip the tube and feed another predetermined portion of the tube over the cutting member for the cutting operation.

10. A tube-cutting machine in accordance with claim 9 wherein an electric switch is adapted to be actuated by the cut-off piece of the tube as it falls, said electric switch forming part of an electrohydraulic system for automatic control of the tube-cutting machine and positioned in said electrohydraulic system to cause a complete shut-down if the electric switch is not actuated at the end of a cutting cycle.

* * * * *